United States Patent Office 3,093,546
Patented June 11, 1963

3,093,546
ABSORBENT PRODUCT
Ralph L. Atkinson, Westfield, N.J., assignor, by mesne assignments, to Johnson & Johnson, New Brunswick, N.J., a corporation of New Jersey
No Drawing. Filed Dec. 18, 1958, Ser. No. 781,204
5 Claims. (Cl. 167—84)

This invention relates to absorbent products and more particularly concerns catamenial dressings, such as sanitary napkins and tampons, which contain a deodorant.

Normally, the pH of the vagina varies from about 4.0 to about 5.0. During the menstrual cycle, however, there is generally a shift of pH towards the alkaline side due to the alkalinity of the vaginal excretions which provides an ideal environment for the pathogenic organisms, such as streptococci, enterocci, diphtheroids and coliform bacilli, which are normally present in the vagina. Since menstrual excretions contain various types of organic materials, such as mucus, blood and blood derivatives including hemoglobin, fibrin, blood albumin and serum, and compounds connected with excretions of the ovary and uterus, the presence of the pathogenic organisms causes the formation of decomposition products, including albuminous bodies and derivatives related to ptomaine and purine compounds, which are odoriferous and unpleasant.

Previous attempts to eliminate or reduce the odor present or which may be present during the menstrual period have included incorporating into catamenial dressings, antibiotics, quaternary ammonium compounds, and compounds which liberate oxygen. Although these compounds are useful as deodorants, they may have undesirable effects and cause sensitization, irritation and allergenic reactions, particularly if used over extended periods of time. Further, some of the deodorants used heretofore are unstable and lose their effectiveness in storage.

I have found that an effective deodorizing catamenial dressing may be obtained by incorporating into the dressing a water insoluble halogenated diphenyl methane having the following structure:

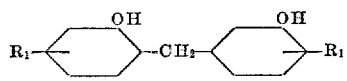

wherein $R_1$ and $R_2$ are hydrogen or chlorine. Compounds of this type include the chlorinated dihydroxy diphenyl methanes, such as 2,2', dihydroxy 3,5-3',5' tetrachloro diphenylmethane and 2,2', dihydroxy 3,5,6-3',5',6' hexachloro diphenyl methane such as 2,2', dihydroxy 3,5-3',5' tetrabromo diphenyl methane and 2,2', dihydroxy, 3,5,6-3',5',6' hexabromo diphenyl methane and derivatives thereof.

The deodorant is incorporated into the dressing as a solution of the deodorant in a hydric alcohol having humectant properties and is retained in the dressing by means of a water dispersible resin binder. Due to the humectant properties of the hydric alcohol, the dissolved deodorant is present at the surface of the water dispersible resin binder thus making it available to exercise its deodorant properties upon contact with menstrual fluid.

The product of this invention provides a means for reducing the formation of odoriferous degradation products of the menses by inhibiting the activity of or destroying the pathogenic microorganisms which are considered responsible for the formation of the odoriferous products. It is effective against both gram positive and gram negative bacteria and provides a superior deodorant action. The dressing does not contribute to the formation of an undesirable alkaline environment under which conditions the formation of malodorous materials are pronounced; it is also stable and retains its deodorant properties over prolonged periods of time.

The above water insoluble halogenated diphenyl methanes are normally crystalline in which form they are ineffective as a deodorant. Their deodorizing effectiveness may be obtained by dissolving them in a hydric alcohol to form a solution. The hydric alcohols have humectant properties whereby the halogenated diphenyl methane is maintained in solution in the catamenial dressing in which it is incorporated even after storage so that it will be effective directly upon use. The humectant property of the hydric alcohols prevents the halogenated diphenyl methane from reverting to its nondeodorizing crystalline form. In addition, the hydric alcohols themselves have anti-microbial properties which further contribute to the deodorizing effectiveness of the dressing. Suitable hydric alcohols for dissolving the halogenated diphenyl methane include the mono, di and trihydric alcohols which are acceptable from the viewpoint of the contemplated use in a catamenial dressing. Preferably, polyethylene glycol or ethylene glycol is used.

To obtain prompt deodorizing activity, the dissolved halogenated diphenyl methane is advantageously placed on a surface of the catamenial dressing which in use is first contacted by menstrual fluid. In a sanitary napkin, the halogenated diphenyl methane may be placed in the napkin cover which forms the outer wrapper so that it will be placed directly against the vaginal area when the napkin is worn.

Incorporating the halogenated diphenyl methane in a non-woven fabric sanitary napkin cover may, in accordance with the invention, be accomplished by mixing a solution of the halogenated diphenyl methane with a water dispersible resin binder which also serves to bind the fibers in the non-woven fabric to integrate it. Water dispersible resin binders are used in covers for napkins, and tampons because such products are subject to moist conditions in use and it is necessary, therefore, to provide a cover which can withstand such conditions without deteriorating or falling apart. The synthetic condensation or polymerization resins, such as polyvinyl alcohol and polyvinyl acetate, are examples of suitable water dispersible resin binders, although other water dispersible resins may be used satisfactorily.

Non-woven fabrics of the type disclosed in U.S. Patent No. 2,705,688 are representative of a cover which may be used in a sanitary napkin embodying the invention. The binder which binds the fibers in the non-woven fabric to integrate it also affixes the halogenated diphenyl methane to the cover to prevent it from being removed by shaking, rubbing and the like. The water dispersible resin binder forms a mixture with the dissolved halogenated diphenyl methane and when the mixture is applied to the web, the halogenated diphenyl methane is distributed throughout the web in those portions of the web to which the mixture is applied.

When the halogenated diphenyl methane in solution is mixed with an aqueous emulsion of the binder, it is uniformly dispersed therein in the form of a suspension. Upon drying the mixture after application to the non-woven fibrous web, the emulsion is broken and the binder coalesces on the fabric to exercise its binding functions at which time the halogenated diphenyl methane in solution migrates to the surface of the binder wherein it is held in solution and accessible to the menstrual fluid.

An example of a sanitary napkin incorporating the invention includes an absorbent core of any suitable material, such as comminuted wood pulp fibers, cotton fibers, or like material, enclosed within a non-woven fabric cover consisting of a fibrous web weighing 246 grains per sq. yd. and containing 25% dull viscose and 75% extra dull viscose fibers arranged in the form of a random web and coated, spot bonded in spaced areas in the manner disclosed in U.S. Patent No. 2,705,688, or otherwise suitably integrated with a water dispersible resin binder. Instead of applying only the binder to the web of fibers during its manufacture, the binder is combined with a solution of the halogenated diphenyl methane to form an aqueous emulsion which is then applied to the web in any suitable manner. An illustrative cover may be formed, by way of example as follows, all parts are given by weight: 1.5 parts of 2,2' dihydroxy, 3,5,6-3',5',6' hexachloro diphenyl methane are carefully added to 10.5 parts of polyethylene glycol with stirring until complete solution is obtained. A binder consisting of 272 parts of polyvinyl acetate, 32 parts of dibutoxy ethylphthalate as a plasticizer and 2 parts of ammonium hydroxide are mixed together to form a second solution. The solution of the halogenated diphenyl methane and polyethylene glycol are added to the binder mixture and an aqueous emulsion obtained. The admixture is then applied to the random fibrous web by spraying, padding, rolling or print bonding in a concentration and pattern which will satisfactorily bind the fibers in the web to form a stable fabric. After applying the binder solution in admixture with the halogenated diphenyl methane in solution, the fabric is dried to form a non-woven fabric integrated with the water dispersible resin binder and containing about 0.7% solids of the halogenated diphenyl methane based upon the weight of the fabric. It is contemplated that other covering material for the catamenial dressing, including other nonwoven fabrics of different construction, may be also used satisfactorily. A covering material so formed may also be used as an outer sheath or cover for a tampon, particularly a tampon which requires a cover to prevent the absorbent core thereof from falling apart and separating during use.

The halogenated diphenyl methane is present in the fabric so formed in a solution in the polyethylene glycol in which form it can exhibit its deoderizing properties. It is also accessible by the menstrual fluid since it is exposed at the surface of the binder which holds it to the fabric. As menstrual fluid strikes the cover, it contacts and dissolves the halogenated diphenyl methane whereupon the halogenated diphenyl methane inhibits the growth of the odor forming microorganisms in the menstrual fluid which cause odoriferous products.

The amount of halogenated diphenyl methane incorporated in a napkin cover may be suitably varied over wide ranges depending upon the degree of deodorization which is desired. A suitable concentration is from about 0.5% to about 2.0% of solids of the halogenated diphenyl methane based upon the weight of the napkin cover.

The catamenial dressing of the invention is stable, exhibits its deodorizing properties directly upon use and effectively eliminates or reduces the presence of odor. It is to be understood that the foregoing descriptions are to be considered illustrative rather than in a limiting sense and that variations and changes may be made in the examples while still remaining within the spirit of the invention.

What is claimed is:

1. A catamenial dressing for absorbing menstrual fluid comprising an absorbent core, a fibrous liquid pervious cover around said core, said cover having distributed in the portion which is to be contacted by menstrual fluid as a deodorizing material a halogenated compound of the formula

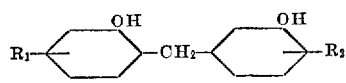

wherein $R_1$ and $R_2$ are at least two chlorines, said deodorizing material being in solution in a polyhydric alcohol having humectant properties and being bound to said cover in admixture in a water dispersible resin binder selected from the class consisting of polyvinyl alcohol and polyvinyl acetate, said deodorizing material being removable from said cover by the passage of menstrual fluid therethrough.

2. A catamenial dressing for absorbing menstrual fluid comprising an absorbent core, a fibrous liquid pervious cover around said core, said cover having distributed in the portion which is to be contacted by menstrual fluid as a deodorizing material a halogenated compound of the formula

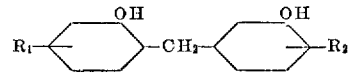

wherein $R_1$ and $R_2$ are at least two chlorines, said deodorizing material being in solution in a polyhydric alcohol having humectant properties and being bound to said cover in admixture in a water dispersible resin binder selected from the class consisting of polyvinyl alcohol and polyvinyl acetate, said resin binder also binding the fibers in said cover to integrate said cover, said deodorizing material being removable from said cover by the passage of menstrual fluid therethrough.

3. A catamenial dressing for absorbing menstrual fluid comprising an absorbent core, a fibrous liquid pervious cover around said core, said cover having distributed in the portion which is to be contacted by menstrual fluid as a deodorizing material, 2,2' dihydroxy 3,5,6-3',5',6' hexachloro diphenyl methane, said deodorizing material being in solution in a polyhydric alcohol having humectant properties and being bound to said cover in admixture in a water dispersible resin binder selected from the class consisting of polyvinyl alcohol and polyvinyl acetate, said deodorizing material being removable from said cover by the passage of menstrual fluid therethrough.

4. A catamenial dressing for absorbing menstrual fluid comprising an absorbent core, a fibrous liquid pervious cover around said core, said cover having distributed in the portion which is to be contacted by menstrual fluid as a deodorizing material, 2,2' dihydroxy 3,5,6-3',5',6' hexachloro diphenyl methane, said deodorizing material being in solution in polyethylene glycol and being bound to said cover in admixture in a water dispersible resin binder selected from the class consisting of polyvinyl alcohol and polyvinyl acetate, said deodorizing material being removable from said cover by the passage of menstrual fluid therethrough.

5. A catamenial dressing for absorbing menstrual fluid comprising an absorbent core, a fibrous liquid pervious cover around said core, said cover having distributed in the portion which is to be contacted by menstrual fluid as a deodorizing material from about 0.05% to about 2% based upon the weight of the cover of 2,2' dihydroxy 3,5,6-3',5',6' hexachloro diphenyl methane, said deodorizing material being in solution in polyethylene glycol and being bound to said cover in admixture in a water dispersible resin binder selected from the class consisting of polyvinyl alcohol and polyvinyl acetate, said deodorizing material being removable from said cover by the passage of menstrual fluid therethrough.

References Cited in the file of this patent

UNITED STATES PATENTS

| 2,693,438 | Ward | Nov. 2, 1954 |
| 2,833,283 | Spahr et al. | May 6, 1958 |
| 2,833,669 | Ziegler | May 6, 1958 |
| 2,837,462 | Morin | June 3, 1958 |

OTHER REFERENCES

Sagarin: Cosmetics, Science and Technology, Interscience Pub., Inc. (1957), p. 733.

U.S. Dispensatory, 25th ed., Lippincott Co., Phil. (1955), pp. 640-1.

UNITED STATES PATENT OFFICE
CERTIFICATE OF CORRECTION

Patent No. 3,093,546            June 11, 1963

Ralph L. Atkinson

It is hereby certified that error appears in the above numbered patent requiring correction and that the said Letters Patent should read as corrected below.

Column 1, lines 41 to 44, the extreme right-hand portion of the formula, for "$-R_1$" read -- $-R_2$ --; lines 49 to 52, strike ou "such as 2,2',dihydroxy 3,5-3',5' tetrabromo diphenyl methane and 2,2',dihydroxy, 3,5,6-3',5',6' hexabromo diphenyl methane and derivatives thereof".

Signed and sealed this 3rd day of March 1964.

(SEAL)
Attest:

ERNEST W. SWIDER

Attesting Officer

EDWIN L. REYNOLDS

Acting Commissioner of Patents